United States Patent
Lazzarini et al.

(10) Patent No.: US 11,866,208 B2
(45) Date of Patent: Jan. 9, 2024

(54) APPARATUS FOR FILLING FOOD CONTAINERS AND CORRESPONDING METHOD

(71) Applicant: ALI GROUP S.R.L.—CARPIGIANI, Cernusco Sul Naviglio (IT)

(72) Inventors: Roberto Lazzarini, Reggio Emilia (IT); Federico Tassi, Bologna (IT)

(73) Assignee: ALI GROUP S.R.L.—CARPIGIANO, Cernusco sul Naviglio (IT)

( * ) Notice: Subject to any disclaimer, the term of this patent is extended or adjusted under 35 U.S.C. 154(b) by 42 days.

(21) Appl. No.: 17/680,192

(22) Filed: Feb. 24, 2022

(65) Prior Publication Data
US 2022/0289409 A1    Sep. 15, 2022

(30) Foreign Application Priority Data
Mar. 10, 2021    (IT) .................. 102021000005594

(51) Int. Cl.
*B65B 3/04*    (2006.01)
*B65B 3/28*    (2006.01)
(Continued)

(52) U.S. Cl.
CPC ............... *B65B 3/04* (2013.01); *B65B 3/045* (2013.01); *B65B 3/28* (2013.01); *B65B 7/28* (2013.01); *B65B 43/40* (2013.01); *B65B 63/005* (2013.01); *B65B 25/007* (2013.01); *B65C 3/26* (2013.01); *B65C 9/46* (2013.01); *B67C 3/22* (2013.01)

(58) Field of Classification Search
CPC ....... B65B 43/40; B65B 43/54; B65B 43/465; B65B 31/024; B65B 3/045; B65B 3/04; B65B 3/28; B65B 39/12; B65B 7/28; B65B 61/26; B65B 63/005; B65B 25/007; B65C 3/26; B65C 9/46; A23G 9/283
See application file for complete search history.

(56) References Cited

U.S. PATENT DOCUMENTS 2,850,255 A * 9/1958 Gould ................. B65B 1/34
                                                    177/121
3,143,178 A * 8/1964 Douglas ............... B65B 1/18
                                                    177/229
(Continued)

FOREIGN PATENT DOCUMENTS

| CN | 106082073 A | 11/2016 |
|---|---|---|
| DE | 3538971 A1 | 5/1987 |
| EP | 2999633 A1 | 3/2016 |

OTHER PUBLICATIONS

Italian Search Report dated Nov. 10, 2021 from counterpart Italian Patent Application No. 10202100005594.

*Primary Examiner* — Joshua G Kotis
(74) *Attorney, Agent, or Firm* — Timothy J. Klima; SHUTTLEWORTH & INGERSOLL PLC

(57) ABSTRACT

Described is an apparatus for filling food containers, including:
  a filling device for filling a food container including a neck through which the food product can be filled and a cap to cover the neck, wherein the filling device is configured to remove the cap and to fill the food container through the neck,
  a food container label printing device configured to print at least one label for the at least one food container;
  a user interface, configured at least to start the filling device; and
  a support for supporting at least the food container.

16 Claims, 8 Drawing Sheets

(51) Int. Cl.
  *B65B 7/28* (2006.01)
  *B65B 63/00* (2006.01)
  *B65B 25/00* (2006.01)
  *B65B 43/40* (2006.01)
  *B65C 9/46* (2006.01)
  *B65C 3/26* (2006.01)
  *B67C 3/22* (2006.01)

(56) References Cited

U.S. PATENT DOCUMENTS

| | | | |
|---|---|---|---|
| 3,386,763 A * | 6/1968 | Ottaway | B65H 3/22 294/119.3 |
| 4,120,134 A * | 10/1978 | Scholle | B65B 43/123 53/472 |
| 4,363,203 A * | 12/1982 | Marshall | B65B 3/045 53/281 |
| 4,363,338 A * | 12/1982 | Brown | B65B 3/045 53/492 |
| 4,445,550 A * | 5/1984 | Davis | B65D 37/00 141/330 |
| 4,494,363 A * | 1/1985 | Rica | B65B 7/2878 53/88 |
| 4,676,285 A | 6/1987 | Schieser et al. | |
| 6,070,622 A * | 6/2000 | Rutter | B65B 55/022 141/2 |
| 6,848,235 B2 * | 2/2005 | Savage | B65B 51/227 53/109 |
| 6,990,391 B1 * | 1/2006 | Cunha | A23G 9/045 700/231 |
| 9,592,924 B2 * | 3/2017 | Decio | B65B 43/50 |
| 10,875,195 B2 * | 12/2020 | Zitting | B25J 15/0023 |
| 10,906,684 B2 * | 2/2021 | Hermans | B65D 75/30 |
| 2014/0134299 A1 * | 5/2014 | Guidorzi | A47J 31/40 222/30 |
| 2014/0345233 A1 * | 11/2014 | Parisini | B65B 31/024 53/167 |
| 2015/0353214 A1 * | 12/2015 | Gerstner | B65D 75/54 53/131.5 |
| 2018/0215488 A1 | 8/2018 | Sebastian et al. | |
| 2018/0244510 A1 * | 8/2018 | Harth | B67C 7/0086 |
| 2018/0303122 A1 * | 10/2018 | Cocchi | A23G 9/12 |
| 2019/0287102 A1 * | 9/2019 | Cocchi | A23G 9/08 |

* cited by examiner

APPARATUS FOR FILLING FOOD CONTAINERS AND CORRESPONDING METHOD

This application claims priority to Italian Patent Application 102021000005594 filed Mar. 10, 2021, the entirety of which is incorporated by reference herein.

BACKGROUND OF THE INVENTION

This invention relates to an apparatus for filling food containers, for example, containers comprising a base product used for preparing liquid or semi-liquid food products.

At present, there are centralized production lines whose purpose is to fill food containers for chains of ice cream parlors. These production lines are not, however, suitable for large businesses. For example, such production lines are unable to effectively adapt to the different needs of small- and medium-sized businesses, for example, because they cannot dynamically adapt to varying food product demands without incurring a significant production cost.

SUMMARY OF THE INVENTION

The aim of this invention is to provide a filling apparatus to overcome the drawbacks of the prior art. For example, one aim of this invention is to allow the production of food containers suitable for small- and medium-sized businesses such as individual ice cream parlors or businesses with a small number of points of sale.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

DESCRIPTION OF THE PREFERRED EMBODIMENTS

The accompanying drawings show a filling apparatus 1 for filling food containers 301 with a liquid or semi-liquid base food product. The food containers 301 filled by the filling apparatus 1 can be transferred to points of sale, for example, individual ice cream parlors, where they can be stored in a refrigerator at a controlled temperature for a certain length of time, for example, 72 hours.

Figure 10:
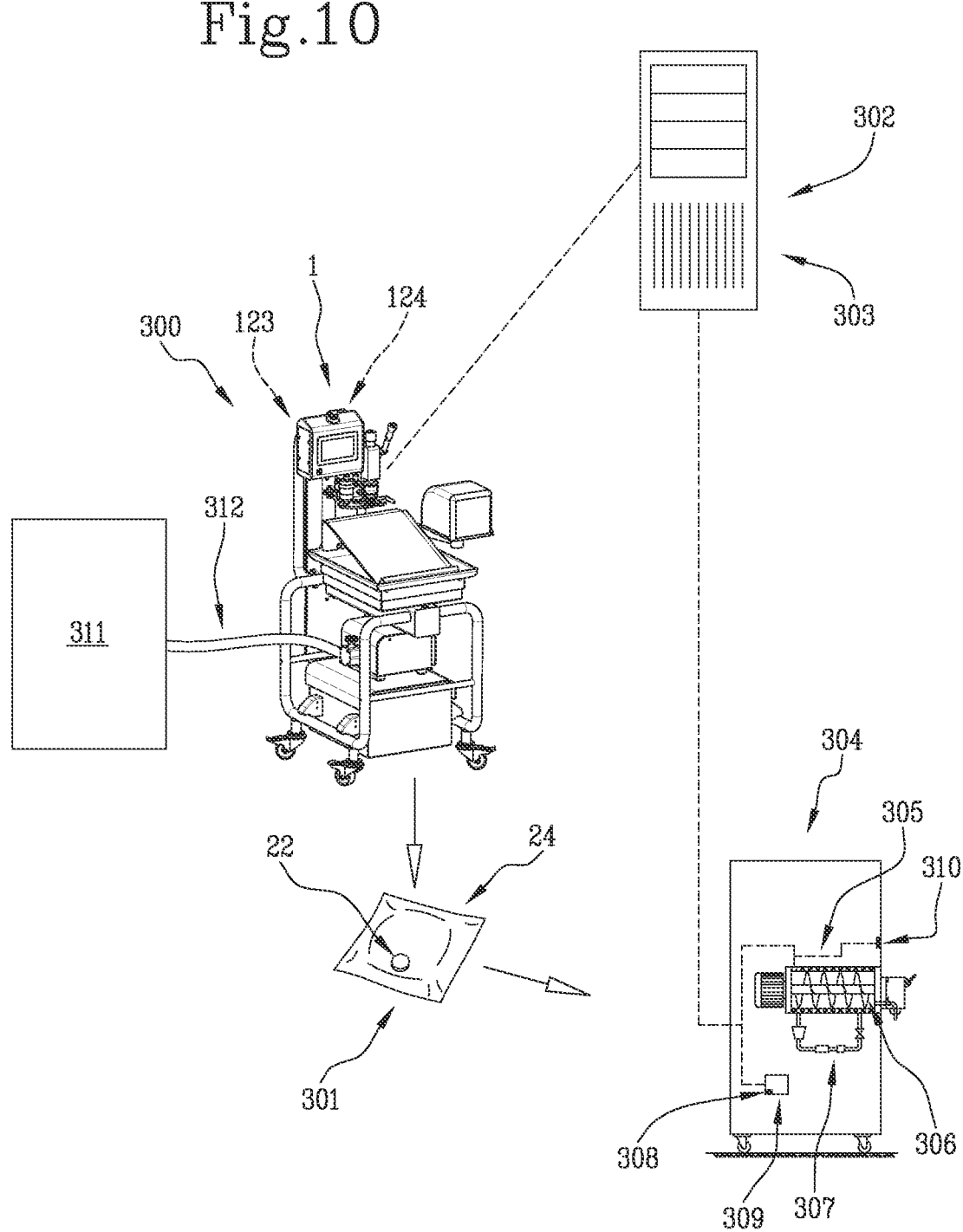
FIG. 10 schematically illustrates a production system according to this invention.

The food containers 301 can be taken out of the refrigerator and placed in machines 304 (an example is shown in FIG. 10) for making finished liquid or semi-liquid food products (for example, ice cream).

The filling apparatus 1 comprises:

a filling device 10 for filling a food container comprising a neck 20 (shown in FIG. 3), through which the food product can be filled, and a cap 22 (shown in FIG. 3) to cover the neck 20.

The filling device 10 is configured to remove the cap 22 and to fill the food container 301 through the neck 20.

The filling apparatus 1 also comprises:

a user interface 14, configured at least to start the filling device 10, an electronic generating unit 17 configured to generate a unique code associated with the food container 301; and a support 16 for supporting at least the food container 301.

Preferably, the apparatus 1 further comprises a food container label printing device 12 (forming part of the electronic generating unit 17), configured to print at least one label for the at least one food container, the label providing information associated with the unique code associated with the food container 301.

The printing device 12 may be a printing device of any kind.

Alternatively, in the absence of the printing device 12, the electronic unit 17 for generating the unique code might be constituted by the interface itself, which is configured to generate this code.

Also alternatively, the electronic unit 17 for generating the unique code might be constituted by a processor and/or a memory (mounted on the machine or remote) configured to generate the unique code based on the data stored in the memory.

In a non-limiting embodiment, the food container 301 may consist of what is known as a bag, that is to say, a container having a flexible body 24, that is to say, a deformable container whose volume varies according to its contents.

According to another aspect, the food container label printing device 12 is configured to print at least one label for the at least one food container 301.

The food container 301 preferably has a single inlet, constituted by the neck 20, which is closed by the cap 22.

The filling device 10 comprises a filling unit 100 that is connectable to a food product source 311, for example, a food product tank, by a pump and a pipe 312, and to the neck 20 of the food container, for example, by a nozzle 101 that can be inserted into the neck 20.

The filling unit 100 is configured to fill the liquid or semi-liquid base food product into the food container 301, for example, automatically.

The filling unit 100 can therefore fill the food container through the dispensing nozzle 101 and can be connected to a circuit with a pump 130 that is capable of extracting the food product from the tank and filling it into the food container 301 through the nozzle 101.

The filling device 10 comprises a clamping unit 102 configured to engage the cap 22 of the food container. The clamping unit 102 may be configured to engage the cap 22 automatically. For example, the clamping unit 102 may approach the cap 22, engage it and lift it away from the neck 20 of the food container.

Preferably, the clamping unit 102 is configured to be movable vertically.

Further, the clamping unit 102 can rotate about a vertical axis of rotation X.

When the filling device 10 is activated, the clamping unit 102 removes the cap 22 from the neck 20 of the food container. Next, the filling unit 100 fills the body 24 of the food container through the neck 20. Lastly, the clamping unit 102 puts the cap 22 back on the neck 20. All the steps of the filling device 10 can be carried out automatically, for example, without any action having to be carried out by a user.

Advantageously, this allows reducing food contamination due to a user removing or replacing a cap while processing is in progress: that is because there is no need for the operator to touch the zone where the food product is being dispensed.

Optionally, the clamping unit 102 may comprise a plurality of jaws 104 which are movable radially and which are configured to clamp the cap 22. For example, the jaws may be disposed at a radially spaced position where they are radially apart during the approaching movement of the clamping unit 102 and at a radially closed position where they are radially close together when the clamping unit 102 is at the cap 22. That way, the cap 22 can be firmly held by the jaws 104. Next, when the clamping unit 102 is moved away from the neck 20, the jaws 104 can remain in position so that the clamping unit 102 moves the cap 22 away with it.

To release the cap 22, the clamping unit 102 can be moved to the neck 20 of the food container so that the cap 22 is brought back into place on the neck 20. Next, the jaws 104 can be moved radially apart (that is disposed at the radially spaced position) and the clamping unit 102 can be moved from the neck 20 of the food container which has been filled.

According to an aspect, the clamping unit 102 comprises an inflatable object (that is, a balloon) 106 positioned centrally relative to the plurality of jaws 104 and configured to inflate during a step of releasing the cap 22 so that the jaws 104 are moved radially apart also as a result of the balloon 106 inflating. The balloon may be connected to a source of compressed air by a pipe (not illustrated in the drawings). Advantageously, this allows ensuring that the jaws 104 are moved apart. This ensures that the jaws 104 do not interfere with the cap 22 when they are moved away.

In effect, if the cap 22 is lifted so it does not seal the container properly, food safety is at risk.

In one or more embodiments, the filling device 10 may be configured to move in relation to the food container 301, in particular in relation to the neck 20 of the food container, so that the components of the filling device 10, for example, the filling unit 100 and/or the clamping unit 102 can be positioned alternately at the neck 20 of the food container.

For example, the filling device 10 may be rotatable about an axis of rotation X to move the filling unit 100 and the clamping unit 102 to the neck 20 of the food container alternately.

The filling device 10 can be supported by a base 108 which can rotate about the axis of rotation X. The base 108 may be positioned laterally relative to the position of the filling unit 100, of the clamping unit 102 and of the neck 20 of the food container.

The filling device 10 may thus carry out the following steps:
  the clamping unit 102 can move close to the food container and can remove the cap 22 of the container,
  the clamping unit 102 can move away from the neck 20 of the food container,
  the filling device 10 can rotate in a first direction about the axis of rotation so as to move the clamping unit 102 away from the food container and to bring the filling unit 100 close to the food container,
  the filling unit 100 can be moved close to the neck 20 and the product can be filled into food container,
  the filling unit 100 can be moved away from the neck 20,
  the filling device 10 can rotate in a direction opposite to the first direction about the axis of rotation so as to move the filling unit 100 away from the food container and to bring the clamping unit 102 close to the food container,
  the clamping unit 102 can be brought to the neck 20 of the food container so as to put the cap 22 back on the neck 20 to seal the full food container.

According to an aspect, the support 16 can be placed under the filling device 10 to support the food container while it is being filled.

Figure 3:
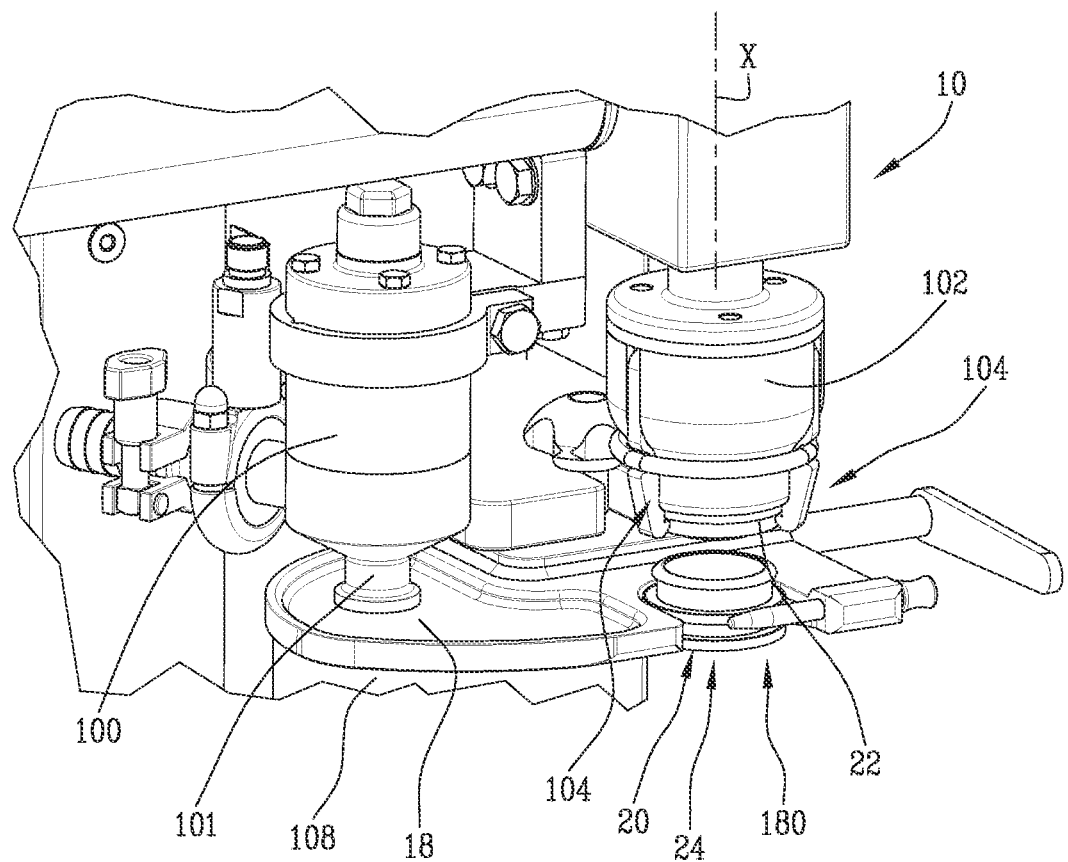
Figure 4:
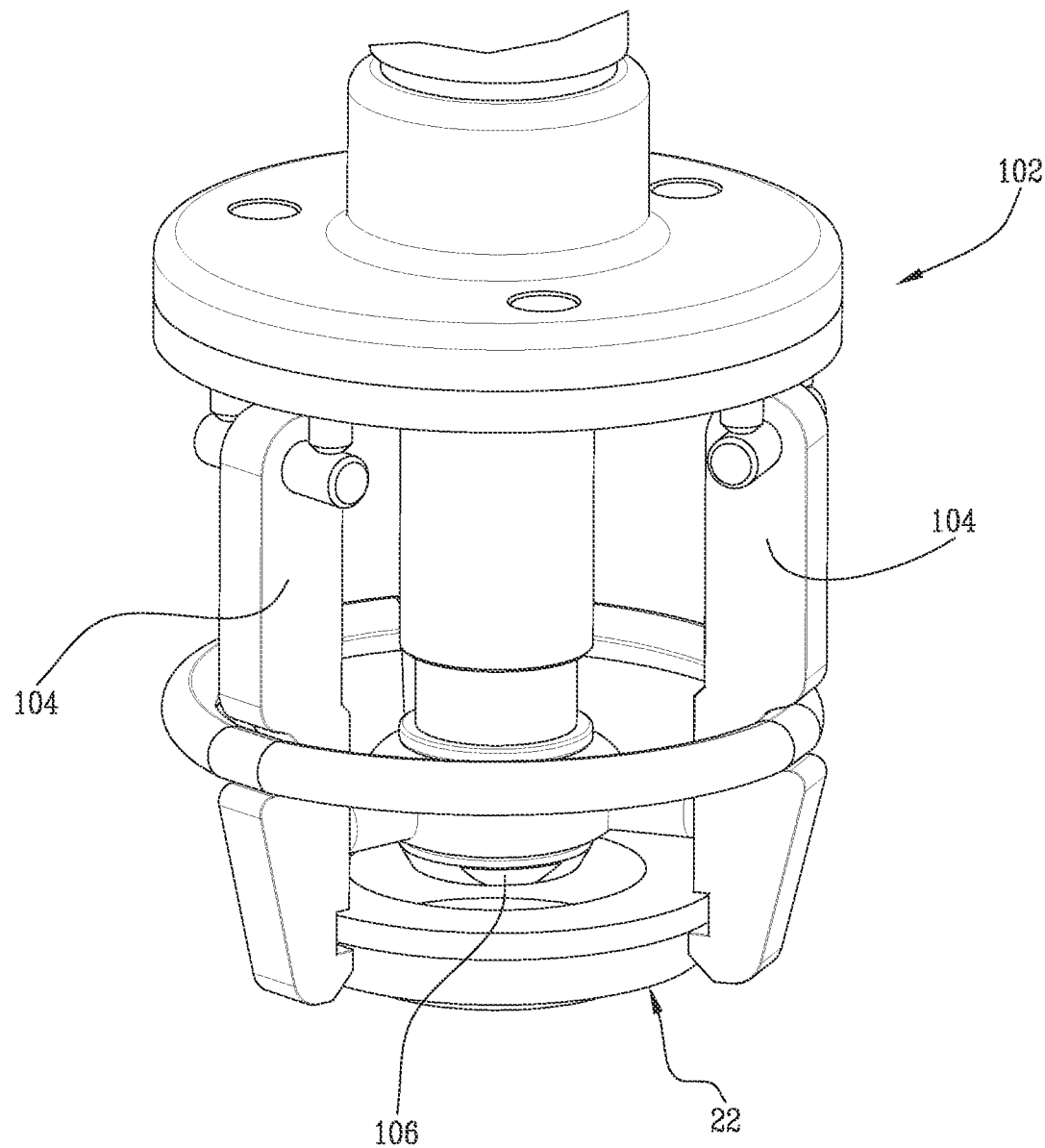
Figure 5:
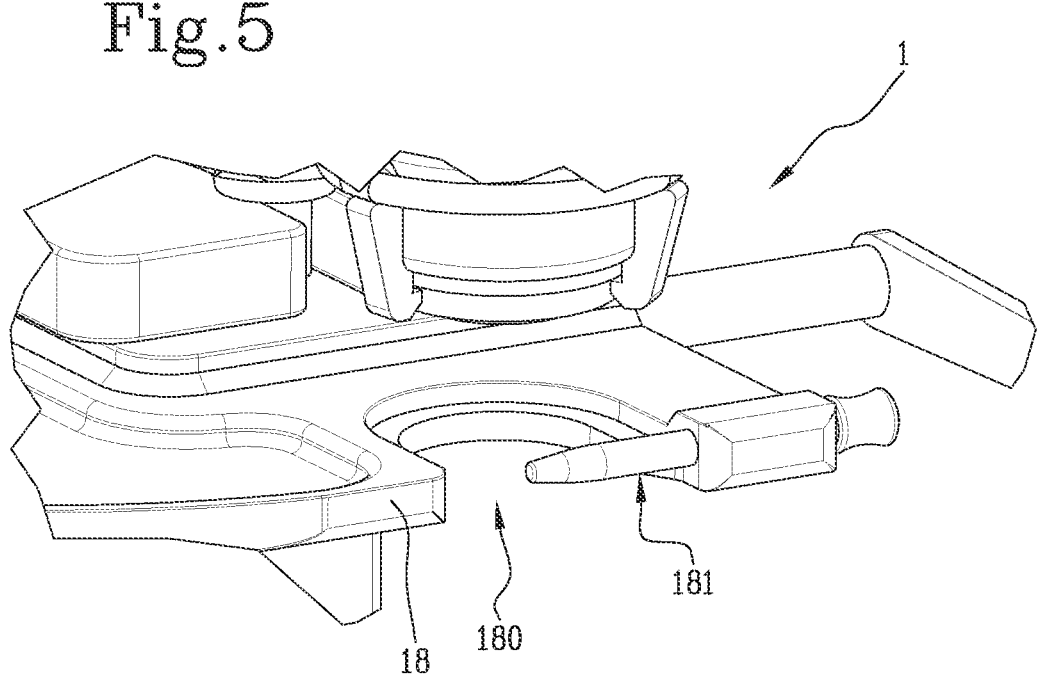
Figure 6:
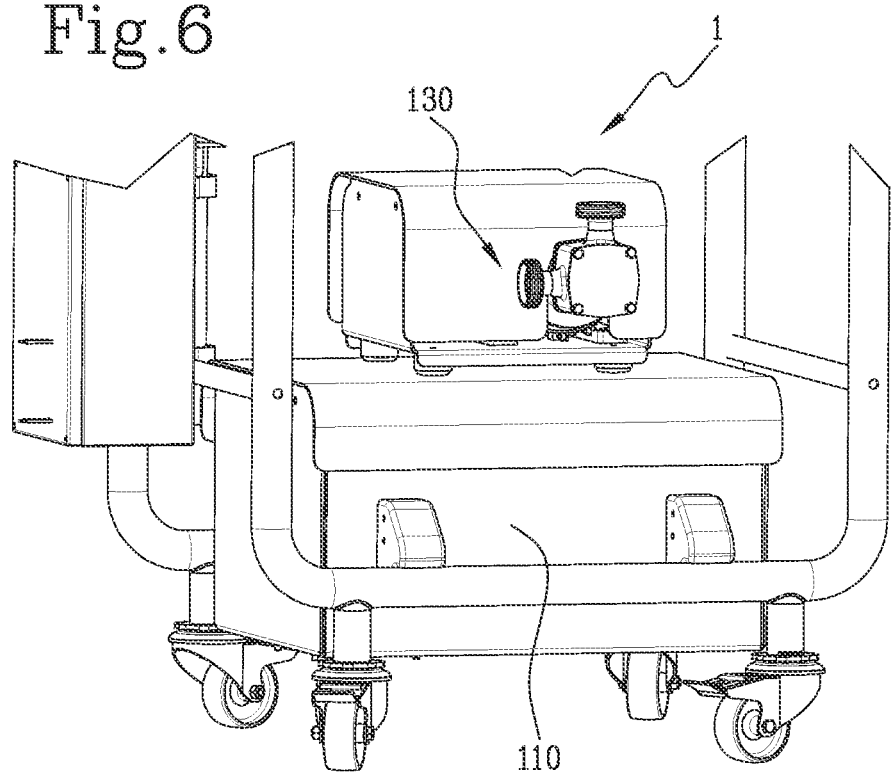
Figure 7:
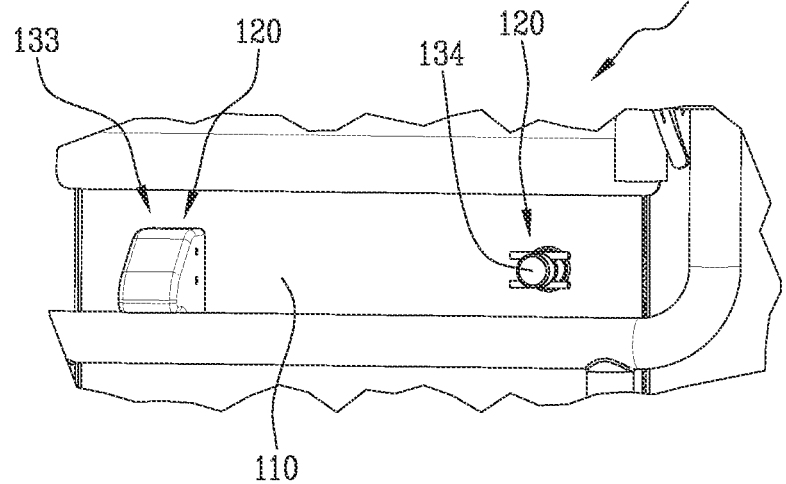
Figure 8:
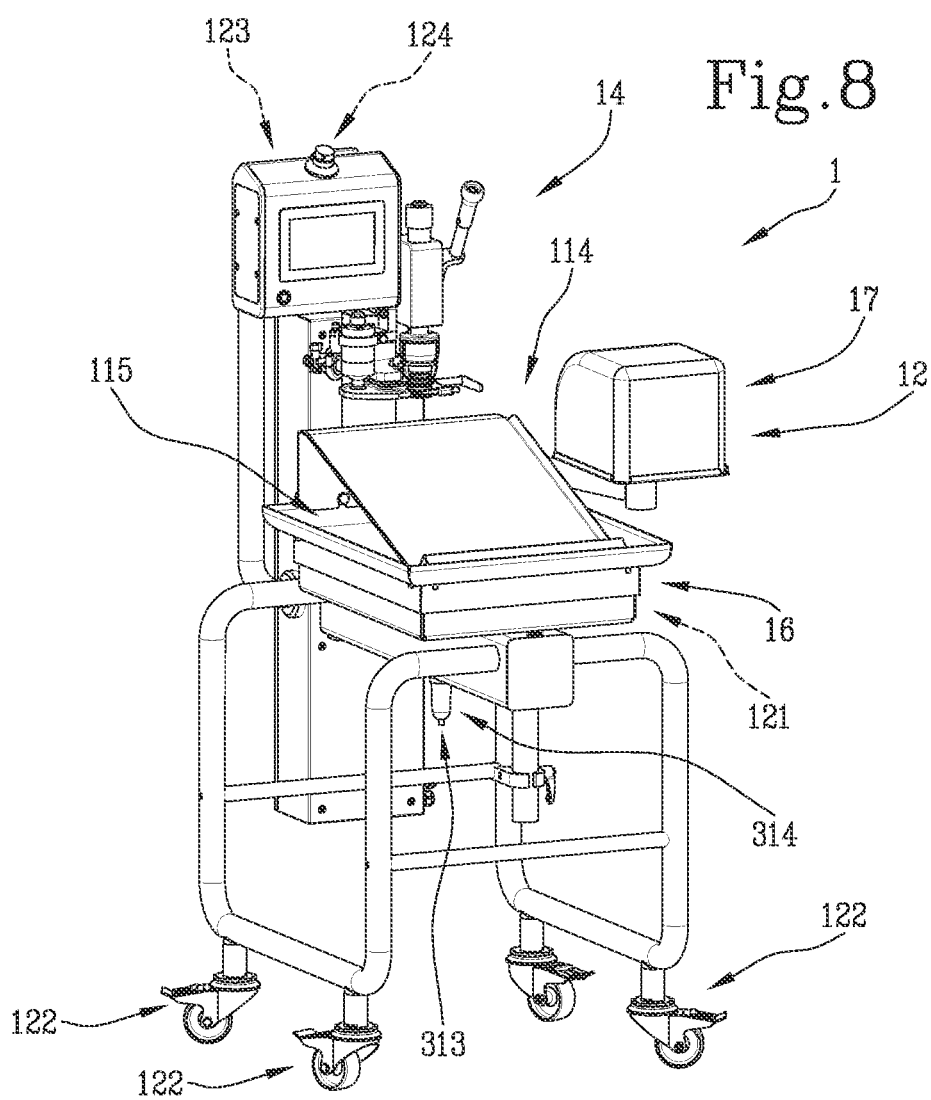
FIG. 8 shows a filling apparatus according to a second embodiment.
Figure 9:
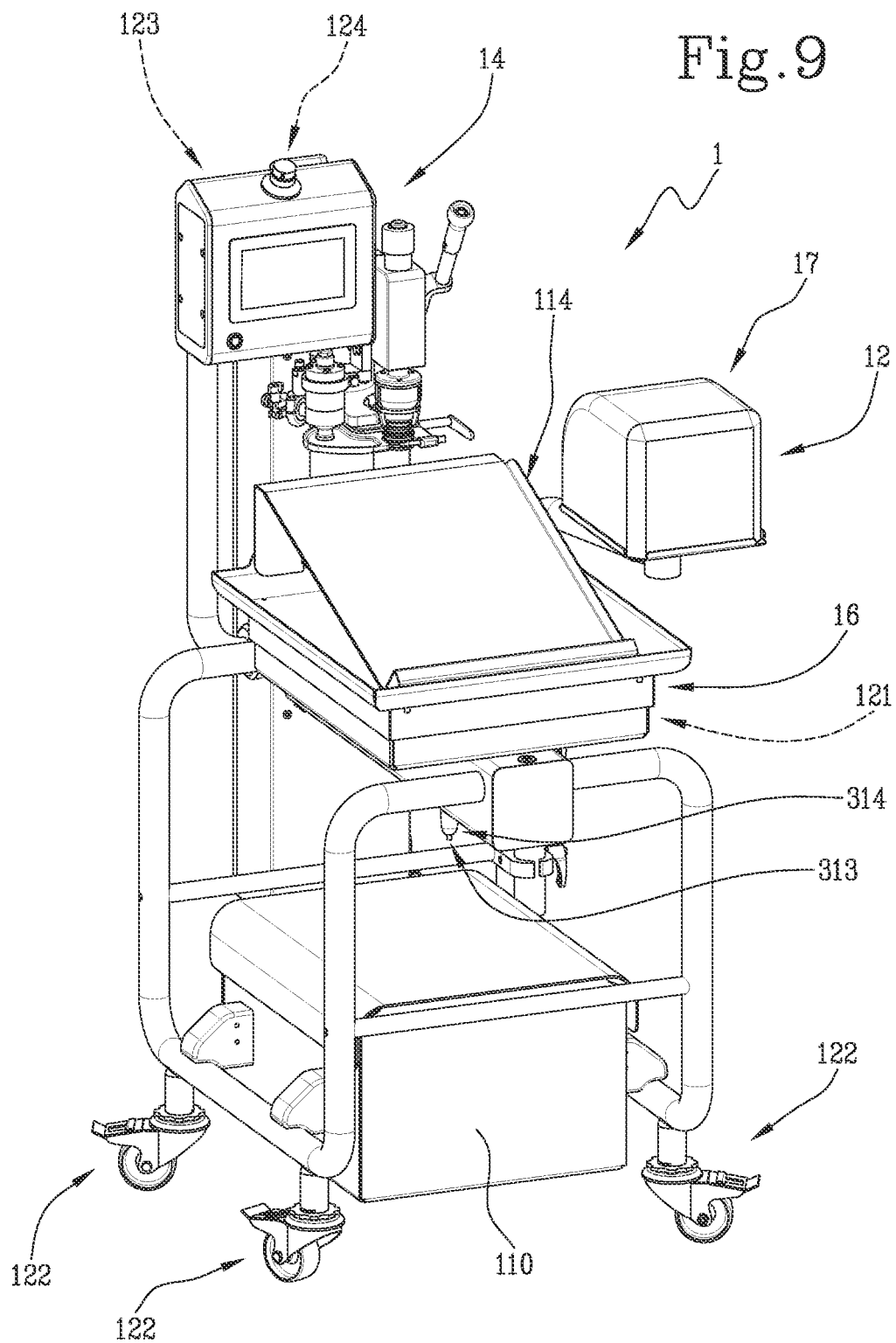
FIG. 9 shows a filling apparatus according to a third embodiment.

The apparatus 1 may comprise a fastening element 18, positionable between the filling device 10 and the support 16 and comprising a recess 180 configured to hold the neck 20 of the food container in place, as illustrated in FIGS. 3 and 5.

Preferably, the apparatus comprises a pin 181 that is movably associated with the fastening element at the recess 180.

The pin 181 is movable between a recess 180 open configuration (where the neck 20 of the container can be inserted into the recess 180) and a recess 180 closed configuration (where the neck 20 of the container can be locked inside the recess 180).

The apparatus 1 may comprise a plurality of legs 122 and a plurality of wheels 131 (connected to the legs 122). Advantageously, that way, the apparatus 1 can be moved around on a trolley that supports the apparatus 1.

According to an aspect, the user interface 14 can be configured to perform at least one or more of the following actions:
  starting, stopping and/or moving the components of the filling apparatus, for example, the filling device 10,
  receiving commands for starting/stopping and/or adjusting settings, for example, length of time after starting or a quantity of product to be filled into the container,
  displaying parameters that indicate the product, the food container and/or the operation of the apparatus, for example, a weight of the container during or after filling,
  receiving filling start parameters that indicate an operator, the product, the food container and/or a quantity of product to be filled into the food container, and/or
  assigning a unique code to the filled food container.

For example, the unique code may comprise a batch serial number and/or may indicate a container filling date, a size of the container, a quantity of product filled, a type of product filled.

According to an aspect, the user interface 14 may be configured to transmit the commands and/or the parameters entered by an operator through the user interface 14 and/or machine parameters to a database 303, preferably remote. For example, the database may be a distributed ledger database (of any kind).

According to an aspect, the at least one printed label may indicate the food product filled into the container and/or the unique code of the food container filled.

Preferably, the label comprises a QR code or a barcode.

According to another aspect, the apparatus 1 comprises a compressor 110 configured to generate compressed air.

Preferably, the compressed air may be used to move parts of the apparatus 1 and/or to feed the pneumatic actuators and/or for cleaning.

Advantageously, the compressor 110 is positioned under or in a zone at the bottom of the apparatus 1.

Preferably, the compressor 110 is positioned inside a box-shaped container 135.

More precisely, according to another aspect, the machine comprises a first frame 111 and a second frame 112.

The second frame 112 is defined by the box-shaped container 135.

The second frame 112 supports the compressor 110, while the first frame 111 supports the other parts of the machine.

The second frame 112 (or the box-shaped container 135) can be coupled to the first frame 111 of the apparatus 1 to be supported by it, or uncoupled from it when in a condition in which it is not supported by the first frame 111.

Figure 1:
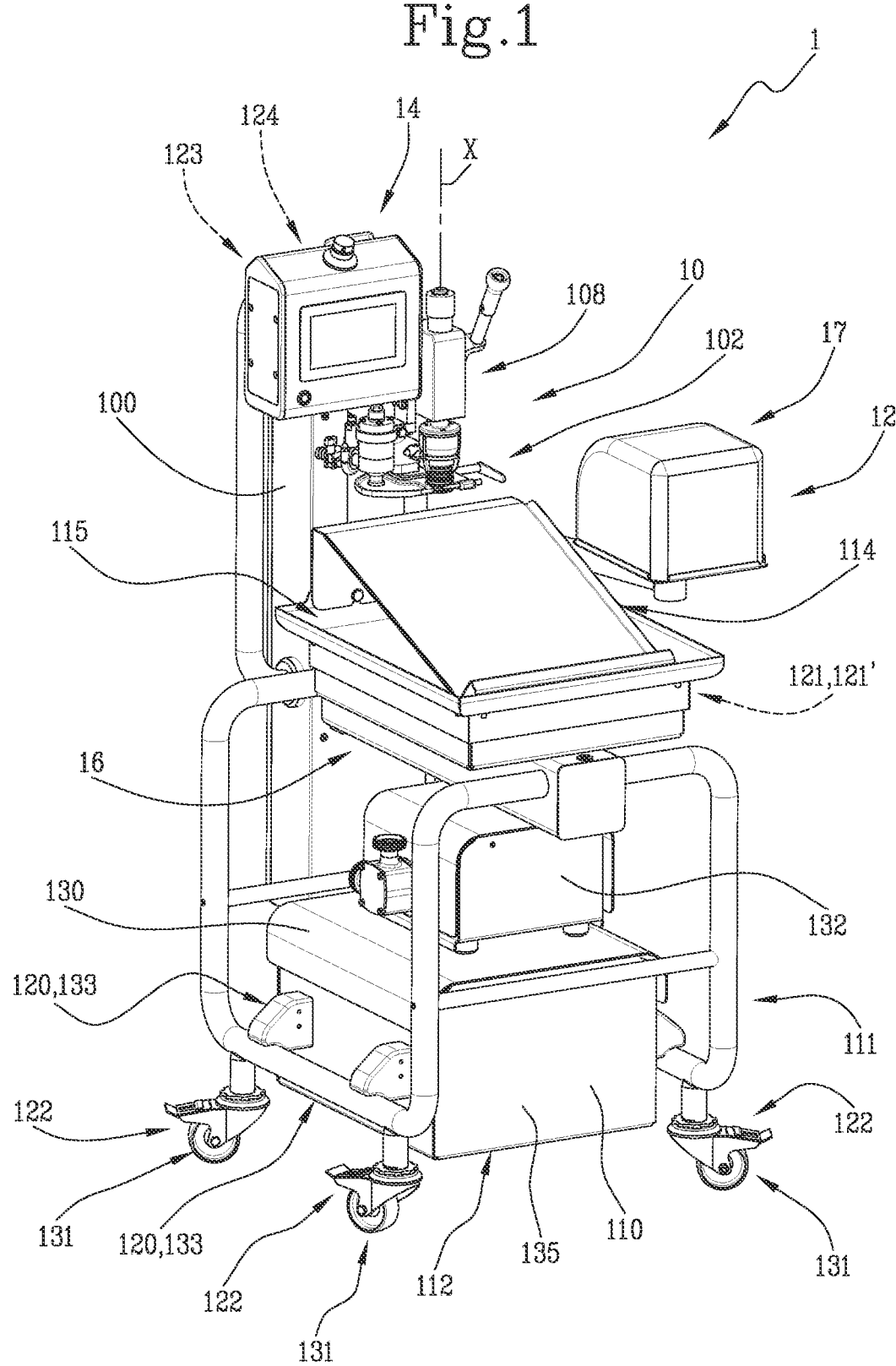
FIG. 1 shows a filling apparatus according to a first embodiment.
Figure 2:
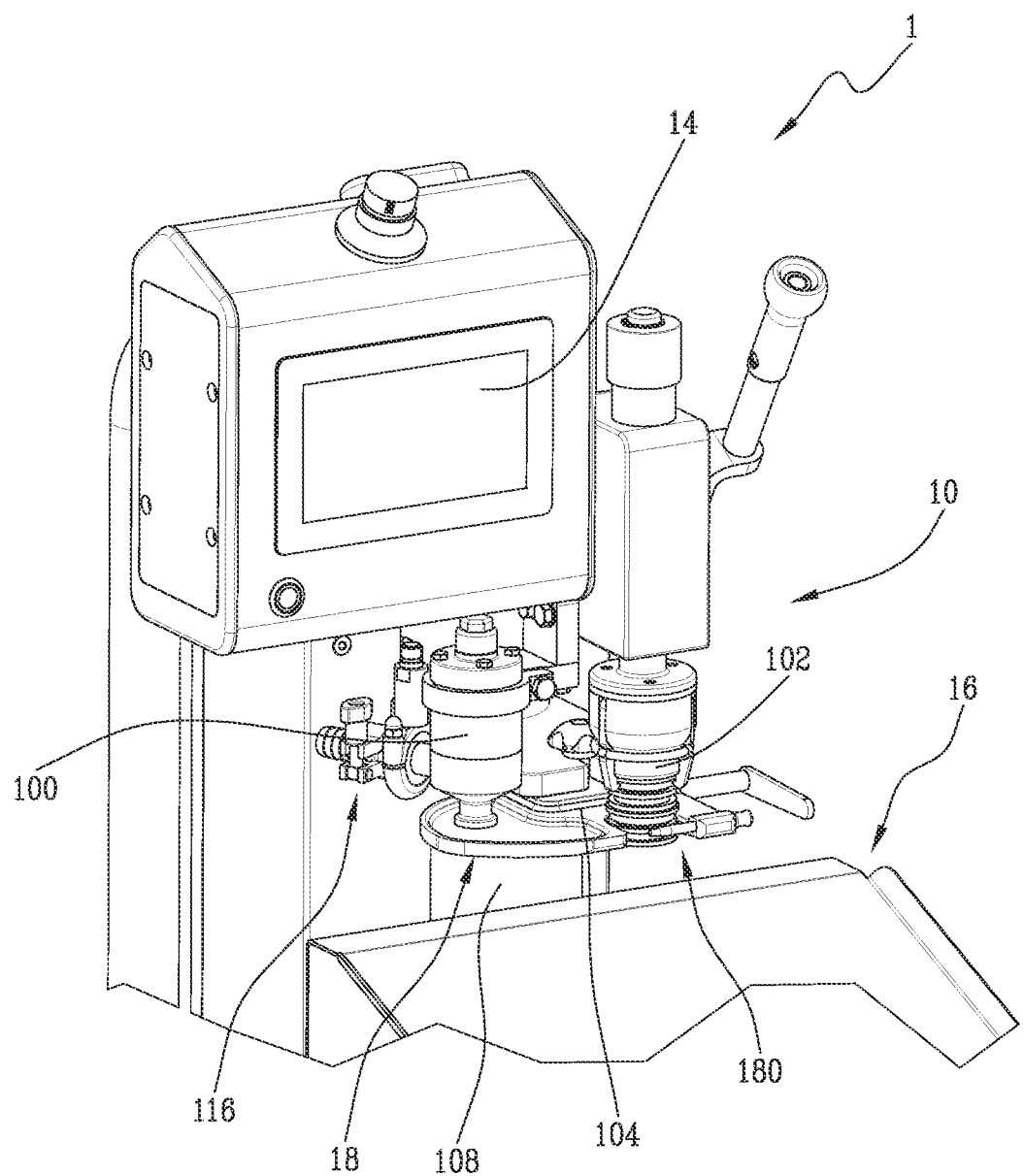
FIGS. 2 to 7 show details of a filling apparatus according to the embodiment of FIG. 1.

More precisely, the apparatus 1 comprises coupling means 120 for coupling the second frame 112 to the first frame 111 and movable between a coupled configuration (shown in FIG. 1), where the second frame 112 is coupled to (carried by) the first frame 111 to be supported by it, and an uncoupled configuration in which the second frame 112 is not carried by the first frame 111.

The means 120 comprise abutment elements 133 by which the second frame 112 is rested against the first frame 111.

The abutment elements 133 are rotatably coupled to a pin 134 that is rigidly connected to the box-shaped container 135 that supports the compressor 110.

Rotating the abutment elements 133 (about the pin 134) through 180°, for example, allows the box-shaped container 135 to be disengaged from the first frame 111 and lowered relative to the first frame 111 until resting on the floor.

In this configuration, therefore, the box-shaped container 135, that is the compressor 110, rests on the floor (preferably on supporting feet, not illustrated) and is mechanically disconnected from the first frame 111.

It should be noted that when the second frame 112 is in the uncoupled configuration, it rests freely on the floor. That way, advantageously, the vibrations of the compressor 110 can be discharged to the floor and are not transmitted to the first frame 111 because the second frame 112 is disconnected from the first frame 111.

Advantageously, therefore, in the uncoupled configuration, the measurement of the weight of the container (performed by a sensor 121 fixed to the first frame 111) is not influenced or in any way affected by the vibrations of the compressor because they are not transmitted to the first frame 111.

It should be noted that the second frame 112 is preferably provided with floor supports (not illustrated).

Preferably, these floor supports are supporting legs.

Preferably, the first frame 111 is also provided with additional floor supports 122 that are adjustable in height to allow levelling the machine (this is particularly important if the machine has a weighing device mounted on it).

According to another aspect, the apparatus 1 also comprises a vacuum pump (not illustrated), with related pipes, which is configured to extract air from a container in the case where the containers used are rigid containers with lids and air extraction valves. That way, advantageously, the pump can be used to extract the air from a previously filled container, so as to create a vacuum in the container (thereby facilitating product storage).

According to yet another aspect, the apparatus 1 comprises a pump 130 which is advantageously used to transfer fluid from a source 311 to the filling device 10, thus allowing the container 301 to be filled.

Preferably, the pump 130 can be used as a flow meter capable of measuring the amount of product filled into the container 301.

Preferably, the pump 130 is housed in a box-shaped container 132 (which is removable from the first frame 111 of the apparatus 1).

According to yet another aspect, the apparatus 1 comprises a supporting surface 114 for the container 301.

The supporting surface 114 is positioned at the bottom of the filling device 10.

Preferably, the supporting surface 114 is inclined relative to a horizontal plane.

Advantageously, the fact that the supporting surface 114 is inclined prevents air from being trapped in parts of the container during filling: in effect, while the container is being filled, the air inside it tends naturally to rise and to be expelled through the top, so the container is perfectly filled and without bubbles formed by air trapped inside.

According to yet another aspect, the apparatus 1 comprises a product drip tank 115 placed around the supporting surface 114 to collect any product that drips out or spills over while the container is being filled.

Preferably, the product drip tank 115 is removable from the first frame 111 of the apparatus 1 (to allow easy cleaning).

According to another aspect, the apparatus 1 comprises a measuring device 121 configured to measure a quantity of product filled into the container 301.

More precisely, the measuring device 121 may comprise the following (alternatively or in combination):
- a weight sensor 121' (positioned to measure the weight of the container, preferably under the supporting surface 114);
- a flow meter, positioned along the product flow path, upstream of the container 301 (this sensor may be associated with the pump 130);
- a sensor that is configured to detect the movement of one or more movable parts of the pump (so as to indirectly measure the flow fed into the container).

It is understood that the measuring device 121 might also be of a different kind.

According to yet another aspect, the apparatus 1 may comprise a machine cleaning device (not illustrated), preferably of the CIP (cleaning in place) type.

Preferably, the cleaning device comprises a box-shaped container.

According to an aspect, the cleaning device comprises a detergent tank.

Preferably, the device comprises an inlet for a cleaning fluid (water, for example) and an outlet.

According to an aspect, the cleaning device is configured to allow mixing the detergent with the cleaning fluid.

Preferably, therefore, the fluid flowing out of the outlet is a mixture of detergent and cleaning fluid.

Preferably, the cleaning device comprises a pipe that is connectable to the outlet and to the inlet of the pump to allow washing/rinsing the ducts of the apparatus 1 that come into contact with the product.

Preferably, the cleaning device is provided with a heater, configured to allow heating the inflowing fluid.

According to yet another aspect, the apparatus 1 comprises a product temperature sensor 116.

The product temperature sensor 116 is configured to capture a signal indicating the temperature of the product fed to the container.

According to an aspect, the temperature sensor 116 is preferably associated with the delivery pipe of the pump 130; still more preferably, with the (metal) inflow or outflow pipe of the pump.

According to another aspect, the temperature sensor 116 is associated with the nozzle 101.

More preferably, the temperature sensor 116 is a sensor that is configured to measure the product temperature indirectly, that is to say, to measure the temperature of an intermediate element (for example, the pump inflow or outflow pipe) that comes into contact with the product.

According to another aspect, the apparatus 1 is provided with a communication module 124 that is connectable to a telecommunications network (for example, Internet).

According to this aspect, the apparatus 1 comprises a control unit 123 that is connected to the temperature sensor 116 to receive the temperature signal.

The control unit 123 is also connected to the communication module 124 to send the temperature data to one or more remote computers (for example, to save them to a cloud).

According yet another aspect, the apparatus 1 may comprise a pressurized air inlet 313 and a pressure regulating device 314.

Advantageously, the air inlet is connected to a compressed air source and the regulating device is used to regulate the pressure.

Preferably, the apparatus 1 also comprises a filter.

Also defined according to the invention is a production system 300 for making liquid or semi-liquid food products, shown clearly in FIG. 10.

The system 300 comprises:
a filling apparatus 1 according to any of the appended claims, for filling a container with a base product;
a communication module 124, connected to the control unit 123 of the apparatus 1;
a container 301 adapted to be filled by the filling apparatus 1 and provided with a unique identification code;
at least one remote server 302, configured to capture data transmitted by the communication module in connection with the filling of the container and connectable to a database 303 for storing the data;
at least one machine 304 for making liquid or semi-liquid food products from the base product in the food container 301, comprising: a processing container 305, equipped with a stirrer 306 and a thermal system 307 associated with the processing container; a dialogue module 308 connected to the remote server 302 to exchange data therewith; a control unit 309 connected to the dialogue module 308, and a user interface 310, connected to the control unit 309 and configured to allow entering the unique identification code of the container 301 (in various ways: typing, capturing by means of sensors, dictation, reading, etc.), the control unit 309 of the machine 304 being configured to retrieve from the data base 303 information associated with the unique code entered.

Preferably, the apparatus 1 is connected to a base product source 311 (illustrated schematically in FIG. 10), preferably through a pipe 312 (which is connected to the pump of the apparatus 1, or directly to the filling device 10).

The source 311 may comprise a pasteurizer, or machine for thermally treating the base product before filling it into the container 301.

According to another aspect, the database 303 is preferably a cloud database.

Preferably, the control unit 309 of the machine 304 is configured to query the database 303 to retrieve information representing the date the container was filled using the filling apparatus 1 and to compare that information with the current date of use in order to determine the time that has elapsed since filling and, if the time that has elapsed since filling is greater than a predetermined use-by date, corresponding to a critical state of preservation, the control unit 309 of the machine 304 is configured to issue an alarm signal, preferably through the user interface 310 and/or to disable at least one operating feature of the machine 304.

Advantageously, this aspect makes it possible to avoid using containers 301 that were filled prior to a predetermined date, thus ensuring optimum food safety of the finished product (because it is known that the bacterial charge of the base product, which is dangerous to human health, can increase over time).

Also defined by this disclosure is a method for filling the food container, comprising:
providing a filling apparatus 1 according to one or more of the embodiments described above, at least one food container having a neck 20 through which the food product can be filled and a cap 22 to cover the neck 20,
positioning the food container on the support 16 of the filling apparatus 1,
starting the filling device 10 through the user interface 14,
removing the cap 22 from the food container and filling the food container by means of the filling device 10,
putting the cap 22 back on the neck of the food container by means of the filling device 10;
associating a unique identification code with the food container 301.

According to another aspect, the step of associating a unique identification code with the food container 301 comprises a step of printing at least one food container label by means of the label printing device 12.

For example, removing/putting the cap back on and/or filling the food container 301 may also comprise a step of moving the filling unit 100 and/or the clamping unit 102 close to the neck 20 of the food container.

In other words, the method may comprise:
moving the clamping unit 102 close to the food container and removing the cap 22 of the container,
moving the clamping unit 102, with the cap 22 on it, away from the neck 20 of the food container,
rotating the filling device 10 in a first direction about the axis of rotation X so as to move the clamping unit 102 away from the food container and to bring the filling unit 100 close to the food container,
moving the filling unit 100 close to the neck 20 and filling the food product into the food container,
moving the filling unit 100 away from the neck 20,
rotating the filling device 10 in a direction opposite to the first direction about the axis of rotation X so as to move the filling unit 100 away from the food container and to bring the clamping unit 102 close to the food container, and
bringing the clamping unit 102 to, for example, in contact with, the neck 20 of the food container to put the cap 22 back on so as to seal the full food container, for example, by opening the plurality of jaws 104 to release the cap 22.

According to an aspect, the method may comprise a step of checking that product is filled into the food container, for example, by weighing the food container during and/or at the end of the step of filling the food container. Weighing may be carried out, for example, by means of:
a weight sensor 121' of the food container,
a volumetric sensor (e.g. a flow meter) which measures a volume in transit in the pump or in the pipe connected to the pump and to the product tank, and/or a sensor for measuring a parameter relating to the quantity of product inside the food container.

According to an aspect, the method may comprise the step of entering the filling start parameters, for example, an operator name and/or code, a product to be filled into the container, a quantity in the form of a weight and/or a volume to be filled into the container.

According to an aspect, the method may comprise the step of assigning a unique identification code to the full container, for example, a batch number.

According to an aspect, the method may comprise the step of stopping the filling unit 100 gradually so that the filling speed of the food container is inversely proportional to the percentage of filling the food container. For example, this avoids the product spilling out of the container during the final stages of filling.

According to an aspect, the method may comprise the step of applying one or more labels on the food container and/or on a box that receives a plurality of food containers.

There may be a first label to be applied on the food container, for example, bearing a QR code and/or an alphanumeric code recognizable by the operator and providing information relating to the product contained and/or a date of filling.

After a predetermined number of first food container labels have been printed, a second label may be printed for application on a box used for transporting the food containers. The predetermined number may coincide with the number of food containers that can be fitted in the box. The second label may indicate the first labels, that is to say, it may indicate the unique codes associated with the food containers on which the first labels have been applied.

According to an aspect, the method may comprise the step of saving the information recorded, for example, entered by the operator and/or the machine parameters (for example, a weight and/or volume of the food containers filled) to a database 303, preferably remote (for example, a central database or a distributed ledger database).

This disclosure also refers to a method for making a food product using one or more food containers made according to the method described above.

The method comprises:
providing a machine 304 for making liquid or semi-liquid food products, for example, a machine for making ice cream, comprising a processing container 305 for processing a base product, a stirrer 306 mounted in the processing container and/or a thermal system 311 for thermally treating food products,
optionally, scanning the label associated with the filled food container,
filling the product from the food container 301 into the processing container 305, and
stirring and/or thermally treating the food product in the processing container 305.

The method may also comprise one or more of the following steps:
checking the food container against the database 303 to determine whether the food container was made within a predetermined time interval, preferably whether it was made after a predetermined date (for example, whether the food container 301 was made within the preceding 72 hours), and
optionally, allowing or preventing the starting of the machine 304 as a function of the check performed.

Advantageously, the above check and/or preventing the machine 304 from operating can make it easier to check the food safety of the products made.

Advantageously, the method for filling the food containers 301 as well as that for making the food product allows safer management of the production cycle to make liquid or semi-liquid food products, specifically ice cream, according to the HACCP procedure.

What is claimed is:

1. A production system for making a liquid or semi-liquid food product, comprising:
   a filling apparatus for filling a food container with a base product, comprising:
      a filling device for filling the food container with the base product, the food container comprising a neck and a cap to cover the neck, wherein the filling device is configured to remove the cap and to fill the food container with the base product through the neck,
      a user interface, configured to start the filling device and an electronic generating unit configured to generate a unique identification code for the food container, and
      a support for supporting the food container;
   a communication module, connected to an apparatus control unit of the filling apparatus;
   the food container adapted to be filled by the filling apparatus and to include the unique identification code;
   a remote server, configured to capture data transmitted by the communication module in connection with the filling of the food container and connectable to a database for storing the data;
   a machine for making the liquid or semi-liquid food product from the base product in the food container, comprising:
      a processing container, including a stirrer and a thermal system thermally connected with the processing container;
      a dialogue module connected to the remote server to exchange data therewith;
      a machine control unit connected to the dialogue module, and
      a user interface, connected to the machine control unit and configured to allow entering the unique identification code, the machine control unit being configured to retrieve from the database information paired with the unique identification code entered,
   wherein the machine control unit is configured to query the database to retrieve information representing a date the food container was filled using the filling apparatus and to compare that information with a current date of use to determine a time that has elapsed since filling and wherein the machine control unit is configured to issue an alarm signal and/or disable at least one operating feature of the machine when the determined time is greater than a predetermined use-by date, corresponding to a critical state of preservation.

2. The system according to claim 1, wherein the electronic generating unit comprises a food container label printing device configured to print a label on or for the food container, the label providing information paired with the unique identification code paired with the food container.

3. The system according to claim 1, wherein the filling device comprises a filling unit connectable to a base product source and to the neck of the food container and configured to fill the base product into the food container.

4. The system according to claim 1, wherein the filling device comprises a clamping unit configured to engage the cap of the food container, the clamping unit comprising a plurality of radially movable jaws configured to clamp the cap.

5. The system according to claim 4, wherein the clamping unit comprises a balloon positioned centrally relative to the plurality of jaws and configured to inflate during a step of releasing the cap so that the jaws are moved radially apart also as a result of the balloon inflating.

6. The system according to claim 1, wherein the filling device is configured to move relative to the food container, to rotate about an axis of rotation so that some components of the filling device are positioned alternately at the neck of the food container.

7. The system according to claim 1, comprising a fastening element, positionable between the filling device and the support and comprising a recess configured to hold the neck of the food container in place.

8. The system according to claim 1, wherein the user interface is configured to perform at least one chosen from the following:
   at least one chosen from starting, stopping and moving the filling device,
   receiving commands for at least one chosen from starting, stopping and adjusting settings,
   displaying parameters that indicate at least one chosen from the base product, the food container and operation of the apparatus,
   receiving filling start parameters that indicate at least one chosen from an operator, the base product, the food container and a quantity of the base product to be filled into the food container,
   assigning a unique identification code to the filled food container.

9. The system according to claim 1, wherein the user interface is configured to transmit at least one chosen from commands entered by an operator, parameters entered by them operator and machine parameters to a remote database.

10. The system according to claim 1, wherein a label indicates at least one chosen from the base product filled and a unique identification code indicating the food container that has been filled, the label comprising a QR code or a bar code.

11. The system according to claim 1, wherein the storage database is a cloud database.

12. A method, comprising:
   providing a food container comprising a neck and a cap to cover the neck;
   providing a filling apparatus for filling the food container with a base product, comprising:
      a filling device for filling the food container with the base product, wherein the filling device is configured to remove the cap and to fill the food container with the base product through the neck,
      a user interface, configured to start the filling device and an electronic generating unit configured to generate a unique identification code for the food container, and
      a support for supporting the food container;
   positioning the food container on the support of the filling apparatus;
   starting the filling device through the user interface;
   removing the cap from the food container and filling the food container with the filling device;
   providing the unique identification code on the food container;
   providing a machine for making liquid or semi-liquid food products, the machine comprising a processing container for processing the base product, a stirrer mounted in the processing container and a thermal system for thermally treating the food products;
   filling the base product from the food container into the processing container;
   performing at least one of stirring and thermally treating the food product in the processing container to make a finished liquid or semi-liquid food product;
   scanning a label paired with the filled food container;
   checking the food container against a database to determine whether the food container was made after a predetermined date, and
   allowing or preventing starting of the machine as a function of the checking the food container.

13. The method according to claim 12, wherein the step of providing the unique identification code on the food container comprises a step of printing the label with a label printing device.

14. The method according to claim 12, comprising a step of checking that product is filled into the food container, by weighing the food container during and/or at an end of the step of filling the food container.

15. The method according to claim 12, comprising a step of stopping the filling unit with a decreasing flow rate so that a filling speed of the food container is inversely proportional to a percentage of filling the food container.

16. The method according to claim 12, comprising a step of applying the label to at least one chosen from the food container and a box containing a plurality of the food containers.

\* \* \* \* \*